Aug. 29, 1950 J. O. EDSON 2,520,534

MULTIPLEX PULSE REPEATER

Filed Aug. 18, 1945 3 Sheets-Sheet 1

INVENTOR
J. O. EDSON
BY George C. Lord
ATTORNEY

MULTIPLEX PULSE REPEATER

Filed Aug. 18, 1945

INVENTOR
J. O. EDSON
BY George C. Lord
ATTORNEY

Aug. 29, 1950 J. O. EDSON 2,520,534

MULTIPLEX PULSE REPEATER

Filed Aug. 18, 1945 3 Sheets-Sheet 3

INVENTOR
J. O. EDSON
BY George C. Lord
ATTORNEY

Patented Aug. 29, 1950 2,520,534

UNITED STATES PATENT OFFICE 2,520,534

MULTIPLEX PULSE REPEATER

James O. Edson, Great Kills, N. Y., assignor to Bell Telephone Laboratories, Incorporated, New York, N. Y., a corporation of New York Application August 18, 1945, Serial No. 611,283

20 Claims. (Cl. 250—9)

Figure 1:
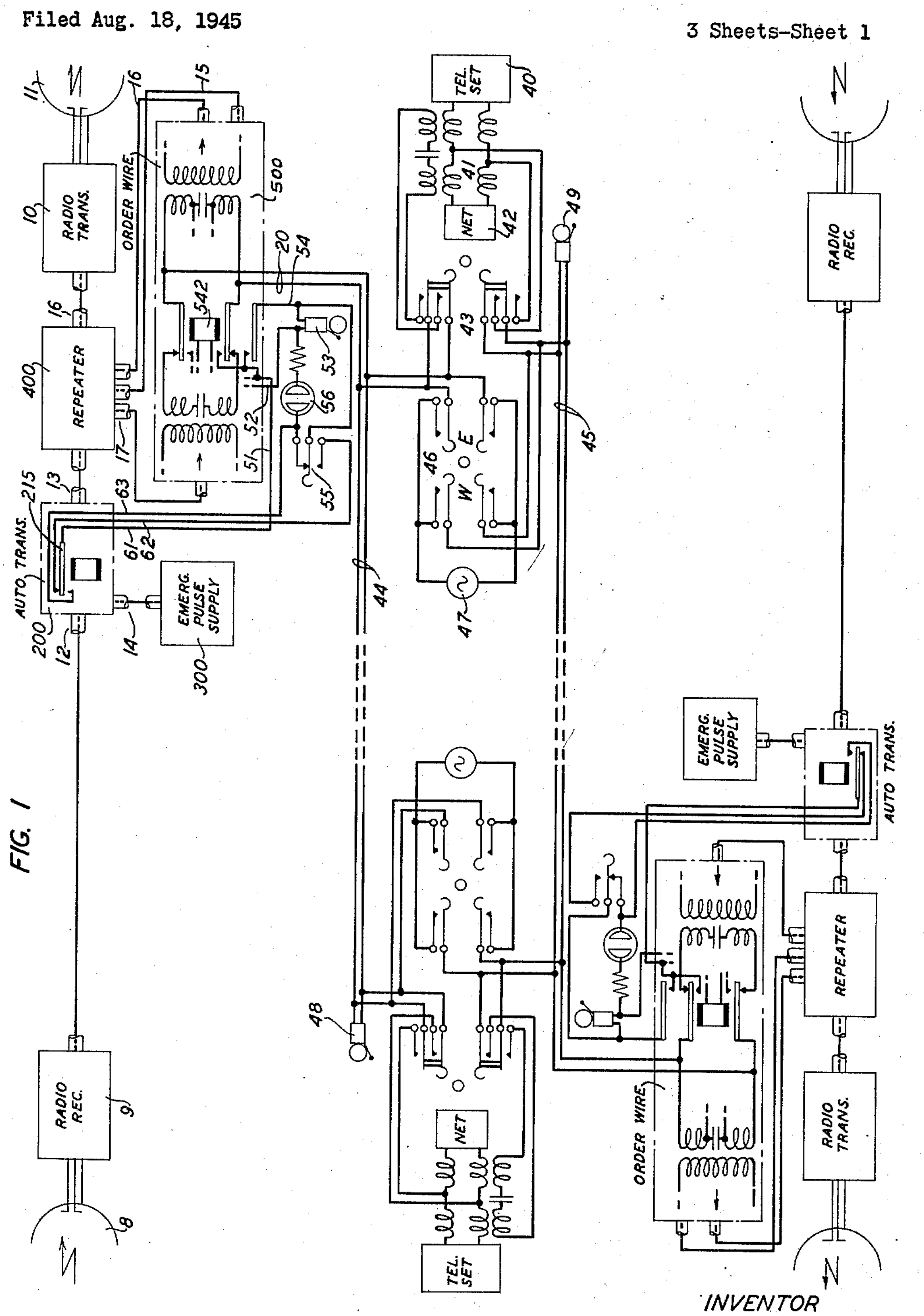

This invention relates to repeaters for time division multiplex radio systems and particularly to order wire and emergency circuits therefore.

One system of radio communication that has been found advantageous particularly at ultrahigh frequencies is that of pulse modulation. In such systems multiplex operation is achieved by interlacing pulses of different communication channels. In the operation of repeaters in systems of this type, it is often advantageous to interconnect the radio receiver and the radio transmitter without coming down to the voice frequency range; that is to detect the incoming radio waves, amplify the resulting pulses and modulate the outgoing radio wave in accordance with the amplified pulses. However, in the operation of such a repeatered system, it is desirable to be able to communicate over the multiplex system between any one repeater station and the terminals or other repeater stations. For this purpose it is necessary that one channel be detected to obtain the signal so that other points in the system can talk with the repeater point. Similarly, it is necessary that provisions be made for modulating an outgoing channel so as to communicate from the repeater station with other points in the system.

In one method of operating such a multiplex system, a synchronizing pulse is transmitted in each frame of channel pulses. As a result the breakdown of a repeater link will result in the failure of any subsequent link because of the absence of these synchronizing pulses.

An object of the invention is to provide communication with an intermediate repeater station in a time division multiplex, pulse position modulation radio systems in which the radio repeaters are operated without bringing the channels down to voice frequency.

Another object of the invention is to localize the failure of one repeater link so that subsequent links continue to function despite such failure.

In accordance with this invention, there is provided in a repeater for a time division multiplex, pulse modulation system, circuit facilities for producing a gating pulse for selecting out one channel pulse so that it may be detected and at the same time eliminating that channel pulse from the array of pulses repeated. Also, there is generated a new channel pulse occurring at the same period in each frame as the eliminated pulse and provisions are made for modulating this new pulse either with the detected signal or with a new voice signal when the operator at the repeater desires to communicate with other stations. In addition there are provided circuit facilities responsive to the absence of a synchronizing pulse output from the radio receiver for automatically supplying locally generated synchronizing and channel pulses to the radio transmitter. This later arrangement permits subsequent links to continue in operation after the failure of one link.

Figure 2:
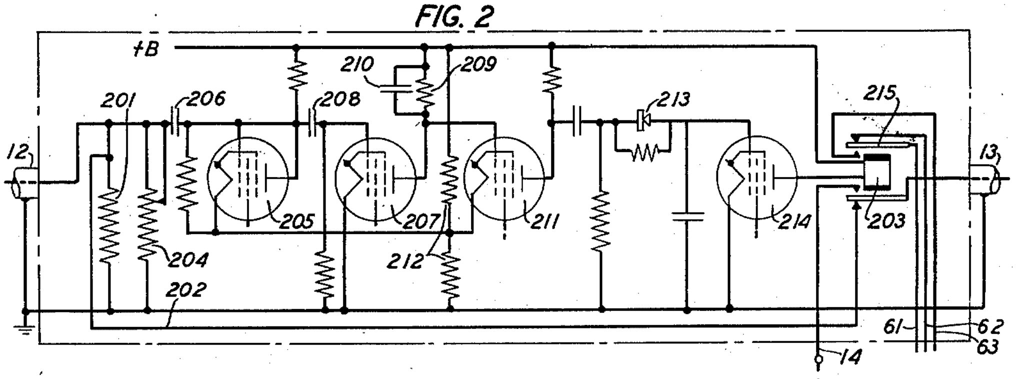
Figure 3:
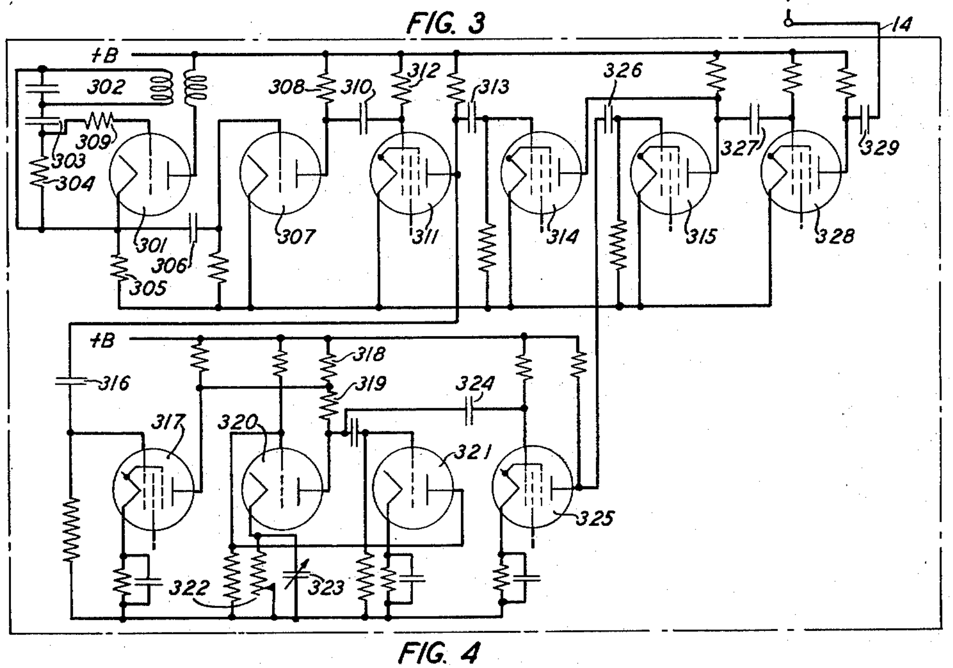

These and other objects, features and aspects of the invention may be more readily understood by reference to the following detailed description in connection with the drawing in which:

Fig. 1 is a schematic circuit diagram of a two-way radio repeater embodying the invention, all portions of the circuit except the voice frequency circuit being shown in block schematic; and Figs. 2, 3, 4 and 5 are schematic circuit diagrams of portions of the repeater of Fig. 1. Fig. 2 showing the automatic transfer circuit, Fig. 3 the emergency pulse generator, Fig. 4 the video repeater and Fig. 5 the order wire circuit.

The repeater shown in the drawings is particularly adapted for operation in the pulse position, time division multiplex radio system of the type shown in applicant's copending application Serial No. 559,354, filed October 19, 1944, to which reference is made for a detailed description of the terminal equipment.

Briefly, in such a system as disclosed in my copending application, there is employed the method of pulse position, or pulse phase modulation, in accordance with which uniform pulses of very short duration recurring at a rate at least twice the highest signal frequency are modulated in time position in accordance with the signal to be transmitted. For telephone communication, where the speech band may be restricted to the frequency range below 3500 cycles per second, a pulse recurrence rate of about 8000 cycles per second and a pulse length of about 1 microsecond is typical.

For the purpose of multiplex operation, the period corresponding to the recurrence rate is divided into a number of equal intervals corresponding to the desired number of channels and a shorter time for use for synchronizing. Thus for an eight channel system, the recurrence period of 125 microseconds (corresponding to 8000 frames per second) is divided into eight channel periods of 15 microseconds each and a synchronizing period of 5 microseconds. The recurrence frequency is determined by a stable control oscillator from whose output there is derived a train of short pulses, eight for each cycle, timed to occur normally at the midpoint of the channel period and a longer pulse occurring in the synchronizing period and marking the beginning of each cycle or frame. This synchronizing or marker pulse may be considered as establishing a time datum against which the time occurrence or position of each channel pulse is compared for the purpose of regenerating the modulating signal at the receiver. At the transmitter, the modulation of each channel pulse by the respective signal varies its time position with respect to its normal mid-period time. The degree of modulation is limited so that the pulse for any particular channel never moves outside the channel period, thus avoiding crosstalk between channels.

At the receiver, the synchronizing pulse is readily separated from the channel pulses by virtue of its greater length and is employed to generate gating pulses coincident and coextensive with the respective channel periods. By means of such gating pulses, the various channel pulses are separated. The selected position modulated channel pulses are converted into length modulated pulses in particular lasting from the time of occurrence of the channel pulse to the end of the corresponding gate pulse. Such length modulated pulses contain the signal which may be obtained by filtering out all components of the length modulated pulses outside of the modulating frequency range.

For radio transmission, the pulses are converted into short trains of ultra-high frequency oscillations of corresponding length and timing. At the receiving terminal, these trains are received and rectified and the rectified pulses are delivered to the receiving multiplex equipment. As described immediately above, the pulses are separated by time division and directed into their respective channel circuits where they are converted into varying length pulses from which the original modulating signals are derived.

Fig. 1 is a schematic circuit diagram of a two-way radio repeater for such a pulse position modulated, time division multiplex system. In the west to east path the radio waves from the terminal transmitter or from the transmitter of a previous repeater are received in the directional antenna 8 and detected in the radio receiver 9 and the resultant video output comprising the pulses is supplied through the automatic transfer circuit 200 to the input of the video amplifier 400, where they are amplified and reshaped. The output of the repeater 400 is supplied to the radio transmitter 10 where the pulses are converted to coresponding trains of ultra-high frequency oscillations suitable for radiation from the directional antenna 11.

The east to west channel comprises similar circuit facilities which are in fact duplicates of those used in the other channel but oppositely directly and will not be described in detail.

*General description*

In brief the functions of the various circuit portions are as follows:

The automatic transfer circuit 200 operates in response to the absence of a video output of pulses from the receiver 9 to transfer the input of the repeater 400 from the output of receiver 9 to the output of the emergency pulse supply circuit 300. This circuit supplies a locally generated array of channel pulses and markers.

The video repeater 400 operates to reshape and amplify the pulses in the video output from the receiver 9 to the proper level for supplying the radio transmitter 10. It also includes connections for tapping off the receiver video output to supply the order wire circuit 500, for receiving from order wire circuit 400 blanking pulses to blank out one channel in the repeater path, and for supplying to that path new pulses modulated by the signal it is desired to transmit from the repeater station.

The order wire circuit 500 provides facilities for selecting the channel pulses used for order wire facilities (channel No. 1), converting those pulses to voice frequency, originating new pulses for the same channel and modulating the new pulses either by the voice frequency signal obtained from the selected channel pulses or by the signal from the repeater operator's telephone set. The pulses for blanking out the order wire channel pulses in the repeater 400 are also supplied by the order wire circuit.

The voice frequency terminals of the order wire circuit 500 are connected to a telephone circuit which permits the repeater operator to listen and talk over either the west to east or east to west radio circuits. These telephone circuits will be described in detail later.

*Automatic transfer circuit (Fig. 2)*

As shown in the detailed schematic circuit of Fig. 2, the video output of the radio receiver 9 connected through the coaxial cable 12 is terminated in the automatic transfer circuit in a resistor 201. From this point the circuit branches. One branch leads through the connection 202 to the back contact of the lower armature of relay 203. The other branch goes to a potentiometer 204.

The relay 203 is normally released so that a connection is made through the back contact of the lower armature to the coaxial cable 13 leading to the input to the video repeater. When relay 203 is operated the output from the radio receiver is disconneted from the video amplifier and the output of the emergency pulse supplied is connected in its place through the connection 14 and the front contact of the lower armature. However, during this period the ouput of the radio receiver remains connected to the potentiometer 204 in the automatic transfer circuit.

The part of the positive input pulses from the radio receiver appearing across the the potentiometer 204 are applied to the grid of the video amplifier tube 205. The positive pulses are repeated at the plate of tube 205 as negative pulses of increased amplitude. The grid of tube 205 is connected to its cathode through a resistor so that it has no standing bias. However a small negative operating bias is developed as the positive input pulses cause grid current to flow charging the coupling capacitor 206. The negative pulses in the output of tube 205 are applied to the grid of the marker selector tube 207 through the coupling capacitor 208.

The plate of the marker selector tube 207 is fed through a resistor 209 of high resistance which is shunted by a capacitor 210. This circuit produces a triangular shaped voltage pulse whose maximum amplitude is directly proportional to the duration of time for which the grid voltage is sufficiently negative to cut-off the plate current. Thus the output voltage of this stage due to the marker pulse which is longer than the channel pulses, attains an amplitude about four times greater than the voltage due to the channel pulses.

The voltage pulses on the capacitor 210 are applied to the grid of tube 211 which is operated as a marker pulse amplifier. By means of the voltage divider 212, the cathode of this tube is held at a potential sufficiently positive with respect to the grid that the channel pulses delivered by the marker selector do not cause plate current to flow. However, the larger pulses from the capacitor 210 corresponding to the marker pulses, produce instantaneous plate current in the tube 211. Thus only the marker pulses will appear in the output of this tube.

Pulses from the plate of the marker amplifier 211 are rectified by the varistor rectifier 213 resulting in a direct current voltage which is supplied to the grid of the marker alarm tube 214 and is of sufficient amplitude to cut-off the plate current of that tube. Accordingly when marker pulses are not received or when they are obscured by noise, the bias on the tube 214 is lost and plate current flows causing the operation of the transfer relay 203. Operation of this relay opens the connection at the back contact of its lower armature to disconnect the radio receiver from the input to the video amplifier and closes the connection at the front contact to connect the input of the video amplifier to the output of the emergency pulse supply, as previously described. In addition, the relay 203 is provided with an upper armature 215 which operates an alarm circuit to be described later. When the system returns to its normal operation, the received marker pulses will again cut off the tube 214 and release the relay 203 again connecting the output of the radio receiver to the input of the video amplifier and opening up the alarm circuit.

*Emergency pulse supply (Fig. 3)*

The vacuum tube 301 is operated as a master oscillator for the emergency pulse supply. The oscillator is of the simple tuned grid type comprising a tuned circuit 302 inductively coupled to the plate circuit of the vacuum tube and also coupled through a blocking condenser 303 and grid leak resistor 304 to the grid. The circuit is proportioned to provide strong feedback so that the vacuum tube operates in a class C manner, that is, with its plate current flowing in spurts of less than one-half cycle duration. A pulsing output voltage corresponding to the plate current variation is taken from the cathode lead resistor 305 and applied through a coupling condenser 306 to the grid of a vacuum tube 307.

This tube is operated as a clipper, its function being to amplify and steepen the sides of oscillator output pulses. For this purpose the grid of the tube is caused to swing alternately between positive and negative voltages sufficiently great to produce alternate saturation and interruption of its plate current. Since the plate current is supplied through a resistor 308 of high resistance, the plate potential drops to a low value when the current is flowing and rises to the full value of the supply voltage when the current is interrupted. The output voltage of the tube 307 thus develops a substantially rectangular wave form alternating each period between a low value during the plate current spurt in the oscillator tube 301 and a high value for the remainder of the period. The division of these intervals can be controlled by adjusting the ratio of the series clipping resistor 309 to the grid leak resistor 304 of the oscillator.

The output of the clipper tube 307 is fed through a coupling capacitor 310 to the grid of a vacuum tube 311. This tube is operated as a marker generator. For this purpose the tube is operated with a low plate voltage so that the amplification for positive changes of grid potential is small. The control grid is held positive with respect to the cathode by virtue of a connection through the resistor 312 to the positive voltage supply. When the oscillator output is positive only a negligible change in plate potential of the tube 311 occurs. When the oscillator voltage swings abruptly negative, the grid of the tube 311 is driven negative. The capacitor 310 is then charged through the resistor 312 until the grid is again positive. Since the grid is driven about 40 volts negative as compared with the positive 300 volts to which it is connected through the grid leak resistor 312, the time required for the potential to become positive is about one-eighth of the time constant of the circuit. The result is to give an output which is a train of nearly rectangular pulses about 4 microseconds in length.

This output is fed through the coupling capacitor 313 to the grid of a tube 314 which is operated as an amplifier and clipper to further shape this marker pulse. The negative output of the tube 314 is mixed with the output of the channel pulse amplifier tube 315.

For the purpose of controlling the generation of the channel pulses, the output of the marker generator tube 311 is fed through a differentiating capacitor 316 to the grid of an amplifier tube 317. The short negative output pulse from this amplifier is delivered to the junction of the series connected resistors 318 and 319 in the plate circuit of the tube 320.

The tubes 320 and 321 are operated as an unsymmetrical multivibrator to generate the channel pulses. The constants of the circuit are such that there are produced a train of eight pulses of approximately seven-tenths of a microsecond in length during the approximate 120-microsecond period following the marker pulse. The negative pulse applied from the tube 317 to the plate circuit of the tube 320 paralyzes the multivibrator during the marker pulse period. The variable resistor 322 provides means for regulating the number of pulses generated. The variable capacitor 323 provides a control for the length of the pulses. These two controls are not independent so that a compensating adjustment of each control must be made when the other control is adjusted. The train of pulses generated is taken off the plate of the tube 320 and supplied through the coupling capacitor 324 to the grid of the amplifier tube 325 which is operated to amplify and clip the pulses. The output of this amplifier is connected through the coupling capacitor 326 to a second amplifier 315.

In the plate circuit of the amplifier tube 315 the channel pulses are mixed with the marker pulse from the marker amplifier tube 314 and supplied through a coupling capacitor 327 to the video amplifier tube 328.

The output of the amplifier tube 328 will contain a complete train of pulses comprising a marker pulse and eight channel pulses which are supplied through the coupling capacitor 329 and the connection 14 to the front contact of the lower armature of the relay 203. The connection to this contact is normally open and as previously described is only closed by the action of the automatic transfer circuit in the absence of the normal pulse output of the radio receiver.

*Video amplifier (Fig. 4)*

The video output of the radio receiver applied through the back contact and lower armature of relay 203 is supplied through the interconnecting cable 13 to the video amplifier where the cable 13 is terminated in the resistor 401. The grid of the first amplifier tube 402 is supplied through the coupling capacitor 403. This tube is self-biased by the voltage drop across the cathode resistor 404 so that with no signal applied the grid bias is slightly negative. When pulses are applied the rectifier action of the grid circuit charges the blocking capacitor 403 and biases the grid to a potential practically equal to the amplitude of the incoming pulses. The output of the tube 402 is coupled to the second amplifier stage tube 405 through the coupling capacitor 406.

A resistor 407 in the plate circuit of tube 402 acts as a matched termination for the delay network 408 connected across the plate-cathode circuit. This delay network is unterminated at its far end. As a result a delayed pulse will be added to the original pulse at the plate of the tube 402. This added pulse will be delayed with respect to the individual pulse by an amount equal to twice the delay time of the network. The sum of the two pulses forms a new pulse which is wider than the original pulse at the bottom. The succeeding stages of the video amplifier circuit amplify and clip this new combined pulse so as to form a pulse lengthened by twice the delay of the network and having a substantially flat top. The function and operation of such a pulse forming circuit is described in detail in the copending application of G. H. Huber, Serial No. 577,954 filed February 15, 1945, Patent 2,457,559, of December 28, 1949.

The grid of the tube 405 is held slightly positive by the voltage drop across the resistor 404. The pulses supplied from the tube 402 are negative as applied to the grid of the tube 405 and consequently will drive the grid to cut-off thereby producing positive pulses in the plate circuit of this tube. These positive pulses are supplied to the third stage amplifier tube 409 through the coupling capacitor 410. The grid of the tube 409 is maintained at a positive voltage obtained from the battery 411 and supplied through the resistor 412. The tube 409 will not conduct heavily because the grid current flow in resistor 412 keeps the grid potential only slightly above that of the cathode. Positive pulses from the plate of the tube 405 cause additional plate and grid current to flow in the tube 409 thereby producing a negative pulse output in the plate circuit and charging the coupling capacitor 410 which further increases the negative bias on the grid. A negative blanking pulse from the order wire circuit 500 is applied through the interconnecting cable 15 and the resistor 414 and capacitor 410 to the grid of the tube 409. This pulse, the generation of which will be described in detail in connection with the description of the order wire circuit 500, is of the order of 13 microseconds in length and coincides with the assigned time for the channel No. 1 pulse. Its amplitude is sufficient to cut off the tube 409 during this pulse interval. Therefore the channel No. 1 pulse will be blanked out of the plate circuit output of the tube 409.

The output of the tube 409 is supplied through a coupling capacitor 415 to the grid of the amplifier tube 416. A new channel pulse from the order wire circuit 500 is also supplied through the interconnecting cable 16 and the coupling capacitor 417 to this grid. Tube 416, like tube 409, has its grid maintained at a positive potential by the battery 418 connected through the resistor 419. The negative pulses applied to the grid of the tube 416 accordingly operate to cut off the plate current producing positive pulses at the plate of the tube 416.

These positive pulses in the output of the tube 416 are supplied through a coupling capacitor 420 to the output amplifier stage 421 which is operated as a cathode follower amplifier and whose output is supplied through the capacitor 422 to the interconnecting cable 16 which supplies the reshaped and amplified pulses to the radio transmitter 10.

Another video amplifier tube 423 has its grid circuit connected in parallel with the grid circuit of the tube 402. The resulting negative pulses in the plate circuit of the tube 423 are coupled through the capacitor 424 to the interconnecting cable 17 by which they are supplied to the input of the order wire circuit 500.

*Order wire circuit (Fig. 5)*

The function of the order wire circuit is to demodulate the No. 1 pulse in a manner similar to the pulse demodulation in the receiving terminal equipment and to convert the resultant voice frequency or voice frequency originating in the repeater operator's telephone set to a position modulated pulse in a manner similar to the pulse modulation in the transmitting terminal equipment. In this way channel No. 1 may be used as an order wire for talking between stations even though the other channels are transmitted through the repeater without being brought down to voice frequency.

The negative pulse outputs of the amplifier 423 of the video amplifier circuit are brought to the order wire circuit through the interconnecting cable 17 and are applied to the grids of the video amplifier tube 501 and the marker selector tube 502 in parallel.

Plate current is supplied to the marker selector tube 502 through resistor 503 of high resistance and the plate is shunted to ground through a timing capacitor 504. During the interval between pulses the grid is held at a slightly positive potential and the plate potential is very low. When a negative pulse is applied to the grid the plate circuit is interrupted and capacitor 504 begins to charge and continues to charge until the pulse ends. Resistor 503 and capacitor 504 are chosen to provide a relatively large time constant so that the rate of charging remains nearly constant in the time interval involved. Accordingly the voltage to which the capacitor 504 becomes charged is proportional to the pulse length. Consequently the relatively long marker pulses will produce voltages several times as great as those produced by the short channel pulses.

The voltage pulses on capacitor 504 are applied to the grid of the marker amplifier tube 505. The cathode of the tube 505 is maintained at a potential which is positive relative to the normal value of the grid potential by means of the voltage divider comprising resistors 506, 507 and 508. The bias thus produced is sufficient to block the plate circuit and to prevent the flow of space current except in response to the larger voltages produced by the marker pulses. These produce negative pulses at the plate of the tube 505 which are coupled through the differentiating circuit comprising the capacitor 509 and the resistor 510 to the grid of the differentiated marker amplifier tube 511. The result is a small negative pulse corresponding to the leading edge of the selected marker pulse and a larger positive pulse of short duration corresponding to the trailing edge of the selected marker pulse. The tube 511 is biased near cut-off by virtue of the connection of the resistor 516 to the junction of resistors 507 and 508 so that only the positive pulses cause plate current to flow. A resistor 512 of high resistance is connected to the plate of the tube 511. Accordingly following the instantaneous plate current produced by the positive input pulses the plate voltage drops back slowly to its original value because of the discharge of the capacitance of the plate circuit of the tube and the connecting circuit through the resistor 512. This plate voltage is coupled through the capacitor 513 to the plate of the tube 514.

Tubes 514 and 515 are connected as a biased multivibrator of conventional type generating a nearly symmetrical wave of substantially rectangular wave form. The instantaneous current from the differentiated marker amplifier tube 511 accurately synchronizes this multivibrator with the marker pulse. In order to facilitate this synchronizing action the multivibrator circuit is designed to oscillate at a frequency slightly lower than the frequency of the synchronizing pulses, namely, 8000 cycles per second. The grid of the tube 514 is connected through a resistor 516 to the cathode resistor 517. This effectively blocks self-oscillation by keeping the grid negative until a sufficiently large input is obtained from the differentiated marker amplifier.

The output of the square wave generator comprising the tubes 514 and 515 taken from the plate of the tube 514 is applied through a resistor-capacitor network 518 to the grid of the tubes 519 and 520 in parallel.

The tube 519 is operated as a gate generator. The negative pulse from the plate of the square wave generator tube 514 drives the grid of the tube 519 far beyond cut-off resulting in a reasonably rectangular postive wave of about 13 microseconds duration at the plate. The plate of tube 519 is connected through a resistor 521 to the plate of tube 522. The value of resistor 521 is chosen such that the plate impedance of the tube 522 is small compared thereto. Consequently, the amplitude of the voltage which appears at the plate of tube 519 is limited. This voltage is fed to the grid of the tube 523 which with tube 524 is operated as the position to width converter.

One-half of the voltage appearing at the plate of the tube 519 is obtained through the voltage divider 525 and supplied by the coupling capacitor 526 to the grid of tube 527. This tube is operated as the blanking tube. The grid resistor 528 in conjunction with the coupling capacitor 526 produces a large self-bias for this tube so that during all of the cycle except the thirteen microseconds period when the gate pulse is delivered by the tube 519 the plate current is cut off. The plate of tube 527 is coupled through the capacitor 588, the interconnection cable 15 and the resistor 414 (Fig. 4) to the tap on the plate resistor of the video amplifier tube 405. The blanking pulse thus supplied in the plate circuit of that tube prevents the through transmission of the channel No. 1 pulse as was explained in the earlier description of the video amplifier.

As previously stated, the incoming negative pulses on the interconnecting cable 17 are supplied to the grid of the tube 501. This tube is operated as a pulse amplifier and its positive output pulses are supplied through the differentiating circuit comprising the capacitor 530 and the resistor 531 to the grid of the tube 522. A high average current is delivered to the grid of the tube 522 by virtue of its connection through the resistor 531 to the positive plate supply. When the plate of the tube 501 goes positive during the time the channel pulses are received, the coupling capacitor 530 is charged to a positive potential but grid current in the tube 522 prevents the grid from being driven appreciably more positive than its normal value. At the end of the received pulse, plate current in tube 501 is again established and the grid of the tube 522 is abruptly driven negative. The grid returns to its normally slightly positive potential under the influence of the current through resistor 531 charging the capacitor 530. The result of this operation is to produce in the plate circuit of the tube 522 positive pulses whose leading edges correspond to the trailing edges of the received pulses. This pulse voltage is coupled to the grid of converter tube 523 through the resistor 521. During the time of occurrence of the channel No. 1 pusle, tube 519 is driven beyond cut-off and hence the plate-cathode impedance of that tube does not attenuate the pulse voltage supplied by tube 522 to the grid of the converter tube 523. The positive pulse of channel No. 1 from the tube 522 and the positive gate pulse from tube 519 applied to the grid of tube 523 are substantially equal in amplitude.

The pulse converter stage which transforms the pulse position modulation of the channel No. 1 pulse to pulse length modulation that contains the original voice frequency signal comprises the two triode tubes 523 and 524. These tubes are connected as a biased or one-shot multivibrator. The two cathodes are connected together through the resistor 532 to the negative plate supply. The grid of tube 524 is coupled to the plate of the tube 523 through the coupling capacitor 533. The grid of the tube 524 is also connected to the positive plate supply through the resistor 534 of high resistance. Accordingly, in the normal or relaxed position, plate current flows in tube 524 and provides sufficient bias through the voltage drop in resistor 532 to bias the cathode of the tube 523 highly positive so that plate current in that tube is blocked. As previously described, the grid of tube 523 is connected to the plate of the pulse amplifier tube 522 through the resistor 521 and to the plate of the gate generator tube 519. The grid of tube 523 is normally at a very low positive potential and the effect of the bias voltage from the drop across resistor 532 is such that it cannot be overcome by either the gate pulse or the channel pulse alone but requires the sum of the two. The gate pulse thus holds the circuit in a prepared condition during the channel No. 1 period so that it is selectively operated by that channel pulse.

The positive channel pulse appearing on the grid of the tube 523 during the time that the voltage of the gate pulse is also applied will cause plate current to flow in the tube 523 and through the multivibrator action the plate current of the tube 524 will be cut off. The circuit constants are so adjusted that once a short positive pulse has caused this transfer of plate current, the circuit will not return to its relaxed condition immediately the signal pulse has passed but instead the new condition will persist until the gate voltage falls back to zero. For this purpose the time constant of the circuit comprising the resistor 534 and the capacitor 533 is made long compared to the time assigned to a channel (the length of the gate pulse). During this period with current flowing through the plate of the tube 523, the grid of the tube 524 is driven negative cutting off the plate current and allowing the cathode potential to drop sufficiently to insure that the tube 523 remains conductive until the end of the gate pulse. When the gate pulse ends, tube 523 is driven to cut-off and tube 524 becomes conductive which is the normal condition of the circuit.

The action of the circuit is such that the plate current in the tube 523 flows in pulses which last from the appearance of the negative differentiated pulse at the end of a channel pulse until the end of the gate pulse and which are therefore modulated in length, with the leading edge varying in accordance with the position of a channel pulse and accordingly with the modulating signal.

A capacitor 535 is shunted across the grid circuit of the tube 523 to delay the time of occurrence of the leading edge of the gate pulse. Otherwise the pulse produced by the leading edge of the marker pulse in the output of the differentiated pulse amplifier tube 522 might rise on top of the gate pulse and interfere with the operation of the pulse converter.

These varying length pulses at the plate of tube 523 contain the modulating signal which is easily recovered by passing the pulses through a low-pass filter 536. For this purpose the plate resistor 537 is tapped and a connection made to the input of a filter through the blocking capacitor 538. The filter 536 is a low-pass filter having a cut-off at about 3500 cycles per second which accordingly passes the speech signal while eliminating the higher frequency components of the pulses. The filtered signal is transmitted through a potentiometer 539 to the grid of the audio amplifier tube 540, the plate of which is connected to the primary of the output transformer 541.

The secondary of transformer 541 is connected to the back contacts of the relay 542. The voice frequency signals obtained from the output of the voice frequency amplifier tube 540 through the transformer 541 are normally supplied through the back contact and armatures of relay 542 to the primary of an audio transformer 543.

The secondary of this transformer is connected through a resistance network 544 to the grid of the voice amplifier tube 545. The series resistor 546 in the grid circuit of this tube limits the voice peak so that the maximnum channel modulation is limited to such a value that the modulated pulse will always remain in the allotted channel time. Cathode feedback is provided for the amplifier tube 545 by means of the cathode resistor 547. Plate resistor 548 of the tube 545 is divided to give the desired maximum voltage to the position modulator. This voltage is tapped off through the coupling capacitor 549 and applied to the cathode of the position modulator tube 550.

The pulse generator tube 520 delivers a triangular pulse directly to the grid of the modulator tube 550. This triangular pulse is produced by charging the capacitor 551 connected between the plate and cathode of the tube 520 through the resistor 552 and the potentiometer 553. This action of charging the capacitor 551 occurs at the time the normally positive grid is driven negative by the output of the square wave generator 514—515 applied directly to the grid of the tube 520. During this period the plate voltage of tube 520 rises at a rate determined by capacitor 551, resistor 552 and potentiometer 553. The slope of the resultant triangular pulse may be regulated by potentiometer 553 so that the time of occurrence of the channel pulse may be adjusted.

Normally the grid of the tube 550 is held approximately at ground potential due to the fact that tube 520 to whose plate it is directly connected is conducting heavily. However, the tube 550 is self-biased to approximately cut off by the effect of the cathode resistor 555 of high resistance. When the grid is driven positive by the effect of the triangular output pulse from the tube 520 a point will be reached at which the tube 550 conducts and its plate potential suddenly drops. Since the potential of the cathode of tube 550 is varied at voice frequency by the amplified voice output of amplifier tube 545 supplied through the capacitor 549, the point at which the potential of the plate suddenly drops will also be varied at the voice frequency.

The cathode resistor 555 is chosen of such value that the mean time of occurrence of the pulse is correct. A by-pass capacitor 556 across this resistor permits the sharp pulses to pass without meeting appreciable impedance but provides a high impedance for currents of voice frequency.

The output of the position modulator tube 550 is coupled through the armature and back contact of relay 557 and coupling capacitor 558 to the grid of the clipper tube 559. Connected between the grid and cathode of the tube 559 is a tuned circuit 560 comprising an inductor and a capacitor in parallel. This circuit is tuned to 500 kilocycles per second and constitutes the circuit in which the channel pulses are formed. When plate current is abruptly established in the position modulator tube 550, a train of oscillations tends to be set up in the circuit 560. The first half cycle of this train of oscillations is negative. On the second half cycle, which is positive, the energy is damped out by the grid current flow in tube 559. Thus the clipper tube produces in its plate circuit a positive pulse which is a half cycle sine wave with a width of approximately 1 microsecond.

Figure 4:
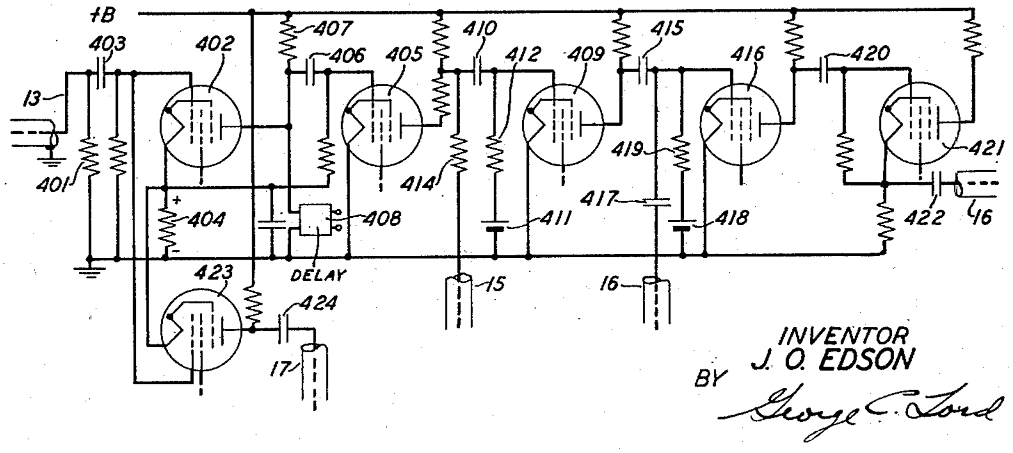
Figure 5:
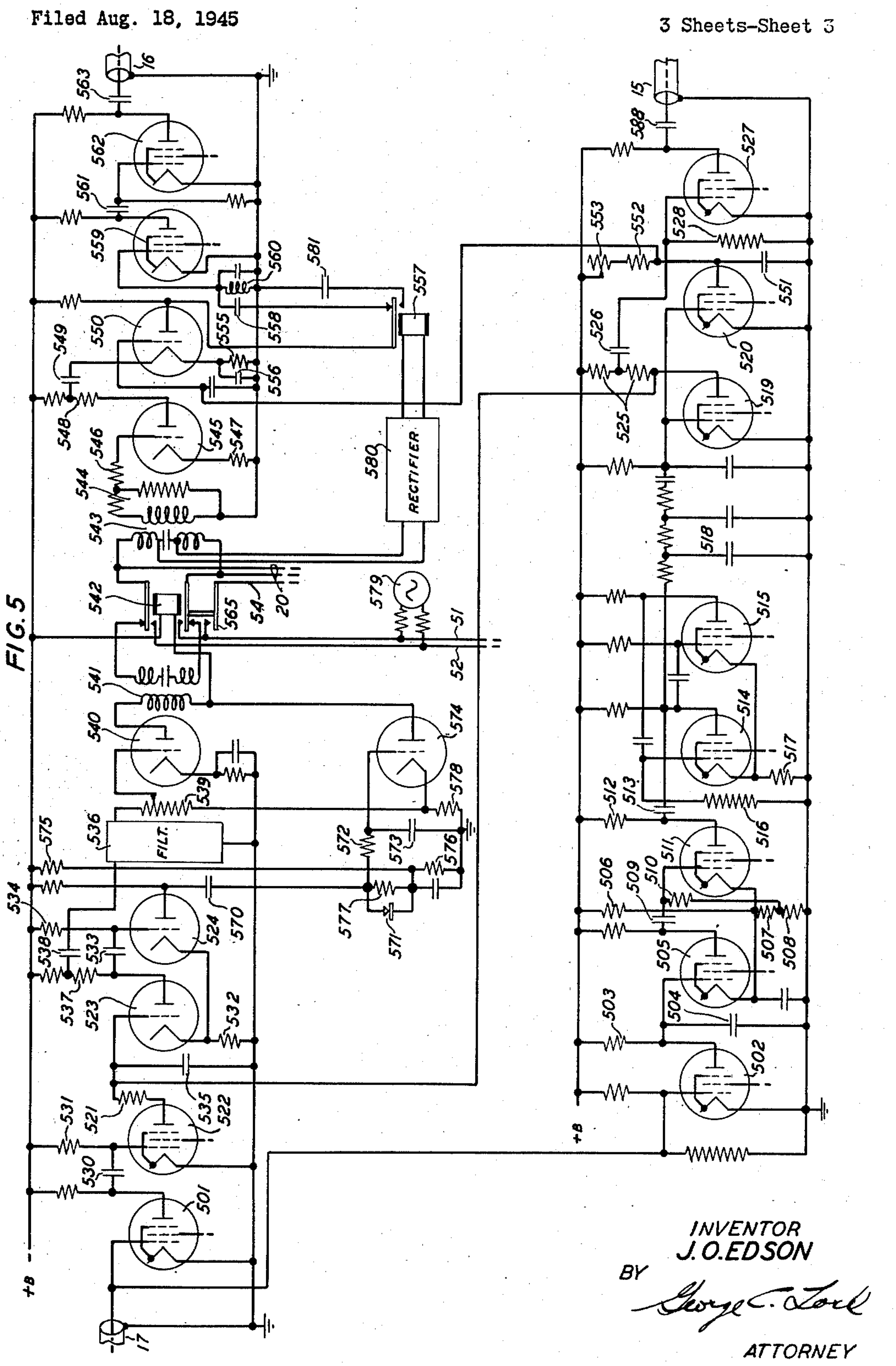

This positive pulse in the plate circuit of the clipper tube is coupled through the capacitor 561 to the grid of the output pulse amplifier tube 562. The amplitude of this input pulse is sufficient to cause grid current to flow which clips the peak of the pulse so that a fairly square pulse is delivered from the plate of tube 562 through the capacitor 563 to the interconnecting cable 16 and hence to the grid of the video amplifier tube 416 (Fig. 4).

*Ringing circuit*

As explained in detail in my copending application previously referred to, ringing is effected in this type of system by suppressing the pulses in the particular channel over which the call is being made. At a receiver point the normal pulse output of a pulse converter is utilized to maintain the local ringing circuit in a disabled condition and the disappearance of these pulses causes the circuit to operate and produce the call signal.

For the purpose of operating the ringing circuit at the repeater, the output of the converter at plate of tube 524 is coupled through the capacitor 570 to the rectifier 571. In the condition of normal transmission (non-ringing), channel pulses whether modulated or unmodulated are impressed across the rectifier 571 and as a result a negative charge is built up on the terminal of condenser 570 adjacent rectifier 571. Leading from this negative terminal of the condenser 570 to ground is a resistor 572 and a second capacitor 573. A steady negative voltage is thus maintained across the capacitor 573 which voltage is impressed on the grid of the ringing tube 574. The net value of the voltage of the grid is sufficient to block space current in the tube 574 and is the difference between the negative voltage on the capacitor 573 and the voltage obtained from the bleeder resistors 575 and 576. A resistor 577 across the rectifier 571 is provided for stabilizing the rectifier. The positive voltage from this bleeder circuit is required when the pulse is removed in the ringing condition at which moment the plate current of the ringing tube 574 must rise from zero to a maximum safe current. Since this value of current is inadequate for operating the ringing relay 542, the output of the tube 574 is supplemented by the current from the tube 540. For this purpose a resistor 578 is provided in the cathode lead of the tube 574 and the potential drop across this resistor is applied to the grid of the tube 540 by way of the potentiometer 537. Accordingly, when tube 574 becomes conductive, the grid of tube 540 receives additional positive bias which increases its plate current.

Operation of the ringing relay 542 opens the circuit from the output transformer 541 of the voice frequency amplifier 540 and applies a ringing voltage from the 60-cycle source 579 to the voice frequency circuit, through the front contacts of the relay 542. This 60-cycle current operates a bell on the telephone circuit through the armature 565 as will be described in detail later. The 60-cycle current is also supplied to the rectifier 580 the output of which causes the operation of the relay 557. The operation of relay 557 opens the circuit between the plate of the position modulator tube 550 and the grid of the clipper tube 559 and shunts a capacitor 581 between the plate of the tube 550 and ground. This removes the new channel No. 1 pulse for the ringing signal to be transmitted over the adjacent radio link.

Operation of a key in the local telephone circuit also applies the 60-cycle voltage to the same point in the circuit so that a ring may be operated from the radio repeater station.

*Telephone circuits*

As indicated previously a telephone circuit is provided for permitting either the operator of the west-east repeater or the operator of the east-west repeater or both to communicate in either direction over the radio links through the medium of the multiplex channel No. 1.

For this purpose there is provided a four-wire telephone circuit interconnecting the voice frequency terminals of the order wire circuits of both the west-east and east-west repeaters through hybrid coils with a telephone set for each operator. A talk key is also provided for each operator so that he may connect his telephone set to this circuit, leaving it disconnected when not in use as the circuit introduces some loss into the repeater path for the order wire channel. Each operator is also provided with facilities which permit him to send ringing signals over the radio path in either direction from the repeater point.

Referring in detail to the telephone circuit for the west-east operator: There is provided a telephone set 40 connected to one terminal of the hybrid coil 41 and balanced by means of a network 42. The branches of the hybrid coil 41 are connected to the separate set of contacts of the talk key 43. The blades for one of these sets of contacts are connected to the voice frequency terminals 20 of the order wire circuit 500 and in parallel to a telephone line 44 leading to a similar talk key and circuit for the east-west operator. The blades of key 43 for the other set of contacts are connected to a second telephone line 45 also leading to the east-west operator's position.

Thus, when the key 43 is closed the operator's telephone set 40 is connected to the voice frequency terminals of the order wire circuits of the two oppositely directed repeaters permitting two-way communication with either or both radio terminals or other intermediate repeater stations in either direction. Similarly, when the east-west operator's key is closed the same communication facilities are available to him, and when both keys are closed the operators may in addition communicate with each other.

*Ringing circuits*

In order to permit the west-east operator to transmit ringing signals in either direction over the radio circuit a ringing key 46 is provided. When this key is closed in the E (right-hand) position, 60-cycle current from the source 47 is applied to the voice frequency terminals 20. As pointed out in detail in connection with the discussion of the order wire circuit (Fig. 5) the application of such current to this circuit causes the operation of relay 557 interrupting the path for the transmission of pulses over channel No. 1.

When the key 46 is closed in the W (left-hand) position, current from the source 47 is applied to the telephone line 45 and accordingly to the voice frequency terminals of the order wire circuit of the east-west repeater. This causes the interruption of the transmission of pulses in channel No. 1, thereby transmitting the ringing signal over that channel.

As was described in detail in the description of the order wire circuit (Fig. 5) ringing signals in channel No. 1 evidenced by the absence of pulses in that channel cause the operation of relay 542. This in turn applies 60-cycle current to the voice frequency terminals 20 which is transmitted over the telephone line 44 causing the bell 48 at the east-west operator's position to ring.

The operation of relay 542 also closes a circuit from the terminal 51 of the 60-cycle source 579 through the armature 565 of relay 542, lead 54, bell 53 and back to terminal 52 of the source 579. This causes bell 53 to ring indicating to the west-east operator that a ringing signal is being transmitted.

The east-west operator is also provided with a bell 49 which will ring when a calling signal is being transmitted in the east-west direction. It is caused to ring by 60-cycle current applied to the line 45 in the same way as bell 48 is operated in response to calling signals over the west-east circuit.

*Alarm*

The bell 53 in addition to its function in the ringing circuit is also used as an alarm to indicate the failure to receive marker pulses and the consequent operation of the automatic transfer relay 203 (Fig. 2). As stated in the detailed description of that portion of the circuit this relay is provided with an armature 215 for operating the alarm circuit.

When the relay 203 is operated due to the absence of received marker pulses a circuit is established from terminal 51 of the 60-cycle source 579 (Fig. 5) through lead 61, armature 215, and its front contact, lead 63, the normally closed contact of key 55 and bell 53 back to the source 579 at terminal 52. This causes the bell 53 to ring due to the supply of 60-cycle current from source 579. At the same time the neon alarm lamp 56 is caused to light by virtue of the fact that it is also connected to the source 579 in parallel with the bell 53 and key 55. Thus the alarm condition is distinguishable from the ringing condition by virtue of the fact that the lamp 56 lights at the same time the bell 53 rings, while in the ringing condition the bell 53 rings while the lamp 56 remains unlighted.

The bell may be stopped by throwing the key 55 to its lower position. Under this condition when the circuit returns to normal the lamp 56 will be extinguished by the interruption of the circuit from source 579 at the armature 215. However, with the key 55 in its lower position the bell 53 will ring again, current from source 579 being supplied thereto through lead 61, armature 215 and its back contact, lead 62, lower contact of key 55 and bell 53 back to source 579 at terminal 52. This time the bell 53 may be silenced by throwing the key 55 to its upper or normal position. The entire circuit will then be in a normal condition in which the bell 53 may again be operated due either to a ringing signal or to failure of the marker pulse.

What is claimed is:

1. A repeater for a time division multiplex system transmitting channel pulses modulated by signals to be transmitted comprising means for selecting one channel pulse, means for detecting the selected channel pulse to obtain the modulating signal, means for blocking the selected channel pulse from the repeated waves, means for generating a channel pulse in time relation to the other channel pulses corresponding to the selected channel pulse, means for modulating the generated channel pulse by a signal, and means for transmitting the generated pulse with the repeated pulses.

2. In a repeater for a pulse position modulation, time division multiplex radio communication system employing recurrent frames of pulses, each frame including a marker pulse and a plurality of channel pulses one for each communication channel and each having an assigned time period in each frame and modulated in time position within said period in accordance with the signal to be transmitted in the respective channel, a radio receiver, an amplifier for the output of said receiver, a radio transmitter modulated by the output of said amplifier, means for selecting the marker pulse output of said radio receiver, means controlled by said selected marker pulses for generating a gating pulse coextensive with the assigned time period of one channel pulse in each frame, means operated by said gating pulse and said one channel pulse for producing pulses modulated in length in accordance with the position modulation of said one channel pulse, means for selecting the modulating signal from said length modulated pulses, means for applying said gating pulse to said amplifier to block the transmission therethrough of said one channel pulse, means controlled by said selected marker pulses for generating a channel pulse in the assigned time period for said one channel pulse in each frame and modulated in time position in accordance with a signal to be transmitted from the repeater, and means for supplying said channel pulses to said amplifier.

3. In a repeater for a pulse modulation time division multiplex radio sytem employing recurrent frames of pulses each frame including a marker pulse and a plurality of channel pulses, a radio receiver for said pulses, a pulse amplifier, a radio transmitter modulated by the output of said amplifier, means for locally producing recurrent frames of marker and channel pulses, means for selecting the marker pulses in the output of said receiver, and means under control of said selected marker pulses for maintaining the input of said amplifier connected to the output of said receiver in the presence of a marker pulse in the output from said receiver and for supplying said locally produced frames of pulses to the input of said amplifier in the absence of such a marker pulse in the output from said receiver.

4. In a repeater for a pulse position modulation, time division multiplex radio communication system employing recurrent frames of pulses each frame including a marker pulse and a plurality of channel pulses, one for each communication channel and each having an assigned normal time position in each frame, a radio receiver for said pulses, an amplifier for the output of said receiver, a radio transmitter modulated by the output of said amplifier, means for locally producing recurrent frames of marker and channel pulses with the channel pulses occurring substantially at their assigned normal time positions, means for selecting the marker pulse output of said receiver, and means under control of said selected marker pulses for maintaining the output of said receiver connected to the input of said amplifier and responsive to the failure of a marker pulse output from said receiver for supplying said locally produced recurrent frames of marker and channel pulses to the input of said amplifier.

5. In a repeater for a pulse modulation, time division multiplex radio communication system, a radio receiver for said pulses, an amplifier for the output of said receiver, a radio transmitter modulated by the output of said amplifier, means for locally producing pulses similar to those normally in the output of said radio receiver, and means under control of the output of said radio receiver for maintaining the output of said radio receiver connected to the input to said amplifier in the presence of a pulse in the output from said receiver and responsive to an absence of a pulse in the output from said radio receiver for supplying said locally produced pulses to the input to said amplifier.

6. In a communication system having a first terminal for transmitting a plurality of pulse trains, each train comprising a communication channel, the pulses of each train being timed with respect to the others to provide a resultant train of pulses, a second terminal for receiving the pulse trains, and a common transmission medium interconnecting said terminals, an intermediate branch terminal coupled with said medium for selecting one of said channels and supplying a new channel to replace the selected channel comprising selector means for selecting the pulses of a train corresponding to said one channel, suppressor means for suppressing the pulses corresponding to said selected channel at the branch terminal leaving gaps in said resultant wave train, means at the branch terminal for producing a train of pulses corresponding with the pulses of said one channel, timing means for timing the produced train of pulses to correspond with the selected pulse train, and means for aplying said produced timed pulses to said common medium where the intermediate branch terminal is coupled thereto to supply a new channel replacing said selected channel.

7. A multiplex communication system of the type in which messages are transmitted in separate channels by pulses of separate trains of pulses, each train of a given cadence frequency, in accordance with signal modulations, comprising a first terminal for transmitting said pulse trains, a second terminal for receiving said pulse trains, a common medium interconnecting said first and second terminals, a branch terminal intermediate said first and second terminals coupled to said common medium, means at said branch terminal for selecting and demodulating the pulses corresponding to a given channel, and means at said branch terminal for preventing access of the pulses corresponding to the selected given channel to said second terminal.

8. A system according to claim 7, further comprising means at said branch terminal for producing a further train of pulses defining another channel, and means for applying said produced pulses to said common medium where the branch terminal is coupled thereto and in timed relation to fill gaps available in said selected given channel 9. A system according to claim 7, further comprising means at said branch terminal for producing a further train of pulses defining another channel, and means for applying said produced pulses to said common medium where the branch terminal is coupled thereto and in timed relation to fill gaps available in said selected channel, a further intermediate branch terminal, means at said further branch terminal for selecting said produced channel, and means at said further branch terminal for suppressing said produced pulses.

10. A system according to claim 7, further comprising means at said branch terminal for producing a further train of pulses defining another channel, and means for applying said produced pulses to said common medium where the branch terminal is coupled thereto and in timed relation to fill gaps available in said selected channels, a further intermediate branch terminal coupled to said common medium, means at said further branch terminal for selecting said produced channel, and means at said further branch terminal for suppressing said produced pulses, means at said further branch terminal for producing a further train of pulses defining a further channel and means for applying said further produced pulses to said common medium where the further branch terminal is coupled thereto and in timed relation.

11. A communication system of the type in which messages are transmitted by time displacement of pulses of a given cadence frequency, in accordance with signal modulations, comprising a first terminal for transmitting said pulses, a second terminal for receiving said pulses, a common medium interconnecting said first and second terminals, a branch terminal intermediate said first and second terminals coupled to said common medium, means at said branch terminal for selecting and demodulating pulses, and means at said branch terminal controllable from one of said first and second terminals for suppressing the selected pulses.

12. A system according to claim 11, further comprising means at said branch terminal for producing a further train of pulses, and means for applying said produced pulses to said common medium where the branch terminal is coupled thereto for signaling to said second terminal.

13. A communication system comprising a first terminal, means for transmitting from said first terminal a plurality of trains of pulses, means for timing the pulses of each said trains with respect to the pulses of the other trains to provide a resultant train of spaced pulses, a second terminal station for receiving said trains of pulses, a common medium interconnecting said terminals, at least one branch terminal intermediate said first and second terminals coupled to said common medium, means at said branch terminal for producing other trains of pulses, and means at said branch terminal for applying said produced train of pulses to said common medium where the branch terminal is coupled thereto and in such timed relation with said resultant train of pulses that said produced pulses are interleaved in said resultant train.

14. A communication system according to claim 13, further comprising means at said branch terminal for selecting one of said trains of pulses, and means for suppressing the pulses of said selected train, and further timing control means to time said produced train of pulses with said selected pulses to replace said suppressed selected pulse train.

15. In a communication system comprising a first terminal for transmitting a plurality of pulse trains, the pulses of each train being timed with respect to those of the other trains to provide a resultant train of pulses, a second terminal for receiving the pulse trains from said first terminal and a common medium interconnecting said terminals, an intermediate terminal coupled with said medium and comprising means for selecting the pulses corresponding to one of said trains, means at the intermediate terminal for suppressing said selected pulses leaving gaps in said resultant train, means at the intermediate terminal for producing other pulses, means at the intermediate terminal for timing said produced other pulses to correspond in time with said selected pulses, and means at the intermediate terminal for applying said produced timed pulses to said common medium in said gaps left by suppression of said selected pulses.

16. In a communication system having a first terminal for transmitting a plurality of pulse trains, each train comprising a communication channel, the pulses of each train being timed with respect to the others to provide a resultant train of pulses, a second terminal for receiving the pulse trains, a common transmission medium interconnecting said terminals, and an intermediate branch terminal coupled with said medium for selecting one of said channels, the method of supplying a new channel to replace the selected channel comprising selecting at the branch terminal the pulses of a train corresponding to said one channel, suppressing the pulses corresponding to said selected channel at the branch terminal leaving gaps in said resultant wave train, producing at the branch terminal a train of pulses corresponding with the pulses of said one channel, timing the produced train of pulses to correspond with the selected pulse train, and applying said produced timed pulses to said common medium where the branch terminal is coupled there to to supply a new channel replacing said selected channel.

17. In a communication system having a first terminal for transmitting on a first carrier frequency and receiving on a second carrier frequency a plurality of pulse trains each train comprising a communication channel, the pulses of each train being timed with respect to the others to provide a resultant train of pulses, a second terminal for receiving the pulse trains from said first terminal and transmitting pulse trains to said first terminal, and a common transmission medium interconnecting said terminals, an intermediate branch terminal coupled to said medium for selecting one of said channels and supplying a new channel to replace the selected channel comprising filter means for separating said carriers, selector means for selecting the pulses of a train corresponding to said one channel from one of said separated carriers, suppressor means for suppressing the pulses corresponding to said selected channel leaving gaps in said resultant wave train, means for producing a train of pulses corresponding with the pulses of said one channel, timing means for timing the produced train of pulses to correspond with the selected pulse train, means for modulating a carrier frequency corresponding to said one carrier with said produced pulse train and means for applying said modulated carrier frequency to said common medium where the branch terminal is coupled thereto to supply a new channel replacing said selected channel.

18. In a communication system comprising a first terminal for transmitting a plurality of pulse trains on a first carrier frequency, and receiving a plurality of pulse trains on a second carrier frequency, the pulses of each train being timed with respect to those of the other trains to provide a resultant train of pulses, a second terminal for receiving the pulse trains from said first terminal and transmitting trains of pulses to said first terminal and a common medium interconnecting said terminals, an intermediate terminal coupled to said medium comprising means for separating said first and second carrier frequencies, means for selecting the pulses corresponding to one of said trains from at least one of said carriers, means for suppressing said selected pulses leaving gaps in said resultant train, means for producing other pulses, means for timing said produced other pulses to correspond in time with said selected pulses, means for modulating said one carrier with said produced other pulses, and means for applying said modulated one carrier to said common medium where the intermediate terminal is coupled thereto and in said gaps left by suppression of said selected pulses.

19. In a communication system, a plurality of terminals, a medium for intercoupling said terminals, means for transmitting time multiplexed pulses over the medium in a plurality of channels, control means at one of said two terminals for providing denial of access to another of said terminals of at least one preselected channel of said plurality of channels.

20. A combination in accordance with claim 19 wherein means are provided for reinserting at said another of said terminals a replacement channel for said preselected channel.

JAMES O. EDSON.

REFERENCES CITED

The following references are of record in the file of this patent:

UNITED STATES PATENTS

| Number | Name | Date |
|---|---|---|
| 2,028,212 | Heising | Jan. 21, 1936 |
| 2,064,905 | Green | Dec. 22, 1936 |
| 2,395,467 | Deloraine | Feb. 26, 1946 |
| 2,406,165 | Schroeder | Aug. 20, 1946 |
| 2,419,570 | Labin et al. | Apr. 29, 1947 |